April 17, 1951 F. A. SHERMAN 2,549,135
ALTERNATING CURRENT GENERATOR
Filed June 15, 1948 2 Sheets-Sheet 1

INVENTOR.
FLOYD A. SHERMAN
BY William Isler
ATTORNEY.

April 17, 1951          F. A. SHERMAN          2,549,135
ALTERNATING CURRENT GENERATOR Filed June 15, 1948          2 Sheets-Sheet 2

*INVENTOR.*
FLOYD A. SHERMAN
BY William Isler
*ATTORNEY*

Patented Apr. 17, 1951

2,549,135

UNITED STATES PATENT OFFICE 2,549,135

ALTERNATING-CURRENT GENERATOR

Floyd A. Sherman, Cleveland, Ohio, assignor to Whizzer Motor Company, Pontiac, Mich., a corporation of Delaware Application June 15, 1948, Serial No. 33,152

1 Claim. (Cl. 171—209)

This invention relates, as indicated, to alternating current generators or alternators, but has reference more particularly to means for regulating the voltage under load of such generators over a wide range of speeds.

A primary object of the invention is to provide a generator or alternator of the character described having inherent or self-regulating voltage characteristics, without the employment therein or therewith of bucking coils, shorted bars, loops or turns, or similar means heretofore used for voltage regulation.

Another object of the invention is to provide a generator or alternator of the character described, in which voltage regulation is obtained through a proper selection of the metals or metallic materials employed in the construction of the stator and rotor of the generator.

Other objects and advantages of the invention will be apparent during the course of the following description.

In the accompanying drawings, forming a part of this specification, and in which like numerals are employed to designate like parts throughout the same, Fig. 1 is a side elevational view of the generator, showing the generator housing side plate;

Figure 2:
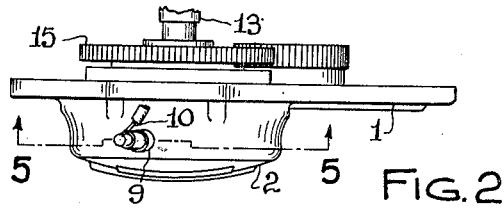
Fig. 2 is a top plan view of the generator and side plate.
Figure 1:
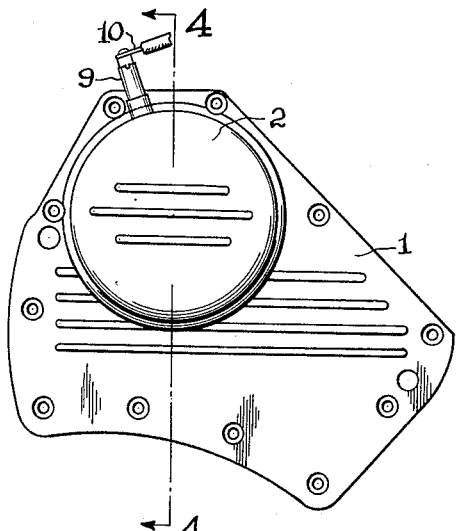
Figure 4:
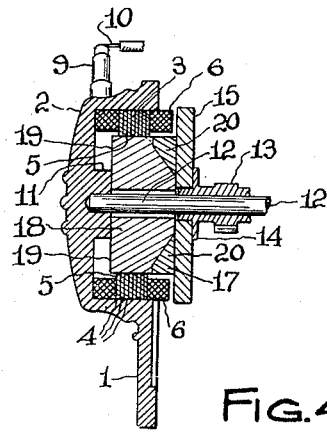
Fig. 4 is a fragmentary cross-sectional view, taken on the line 4—4 of Fig. 1.
Figure 3:
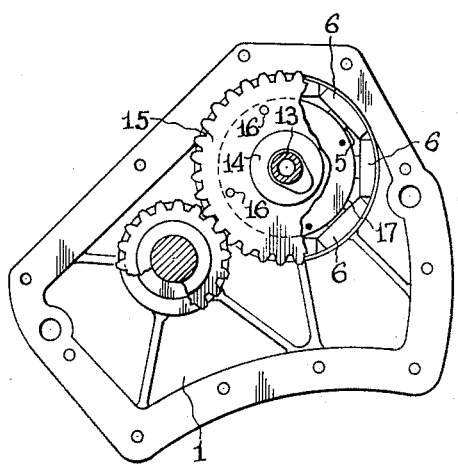
Fig. 3 is a side elevational view of the side of the generator and housing reverse to that shown in Fig. 1.

Referring more particularly to Figs. 1 to 11, inclusive, of the drawings, I have shown a generator which I have designed particularly for use in generating the current required for certain purposes on a gasoline engine driven bicycle, but it is to be understood that the generator has a much wider range of application or use than this specific application.

In the drawings, reference numeral 1 represents the generator housing side plate, preferably made in the form of an aluminum casting, having a cylindrical protuberance 2 forming a housing for portions of the generator to be presently described.

Disposed within the protuberant portion 2 of the side plate is a stator or stator ring 3, which consists of a series of laminations 4 of annular form, having a multiplicity of circumferentially-spaced, radially-inwardly extending poles 5. For the special purposes of the present invention, these laminations are preferably stamped or molded from pure iron, as for example, the type of iron commonly known as Armco ingot iron.

Figure 12:
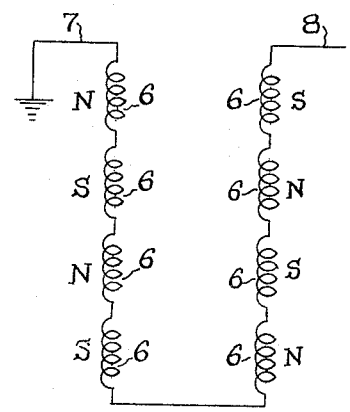
Fig. 12 is a diagram showing the arrangement of the generator coils under certain conditions of use of the generator.
Figure 11:
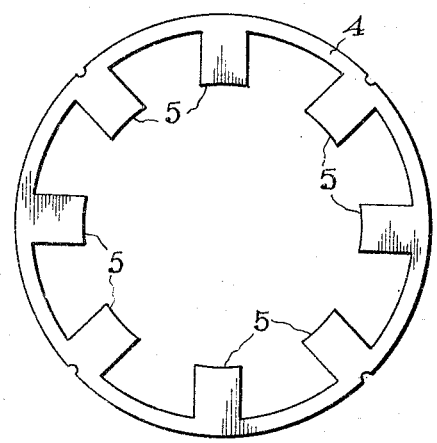
Fig. 11 is a side elevational view of one of the laminations of the stator of the generator.

Coils 6 are wound around each of the poles 5, and these coils are suitably electrically insulated from each other, as well as from the stator in any well-known manner, which need not be described, varnished insulating papers being generally available for this purpose. In this particular case, the coils 6, as shown in Fig. 12, are connected in series with each other, one terminal 7 of the connecting wire being grounded to the housing 1, and the other terminal 8 of the connecting wire extending through a terminal housing 9 which extends radially from the portion 2 of the side plate.

A wire 10 is connected to the terminal 8 and supplies current for the operation of various accessories, such, for example, as the headlamp, tail lamp, ignition system for the gasoline engine, horn and radio. This series arrangement of the generator coils is designed for a constant load requirement.

The casting forming the housing side plate is also provided centrally of the protuberance 2 with a hub 11, in which is journalled one end of the rotor shaft 12, which extends axially through the stator housing and has rigidly secured or pinned thereto a cam shaft 13 provided with an annular flange 14 which abuts one face of a timing gear 15 which is keyed or otherwise non-rotatably secured to the cam shaft 13.

The gear 15 is rigidly secured, as by rivets 16, to a rotor, which consists of a die casting 17 having embedded therein the rotor proper. The rotor is a casting made from a highly magnetic alloy, known as Alnico II, of the following approximate composition:

| | Percent |
|---|---|
| Nickel | 17 |
| Aluminum | 10.3 |
| Cobalt | 12.8 |
| Copper | 5.7 |
| Iron | 54.2 |

Figure 5:
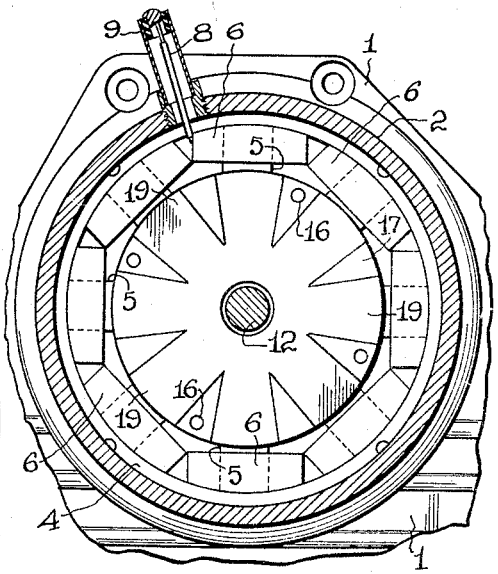
Fig. 5 is a fragmentary cross-sectional view, taken on the line 5—5 of Fig. 2.
Figure 8:
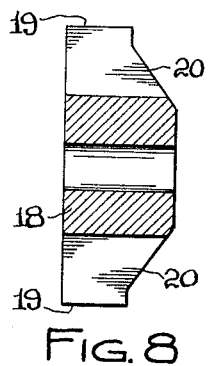
Fig. 8 is a cross-sectional view, taken on the line 8—8 of Fig. 6.
Figure 6:
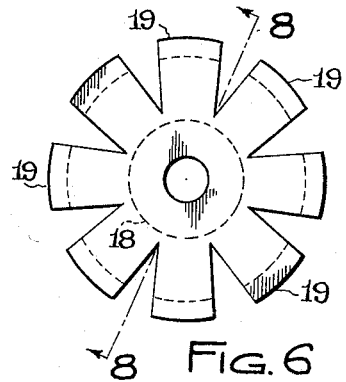
Fig. 6 is an elevational view of the magnetic portion of the rotor of the generator.
Figure 7:
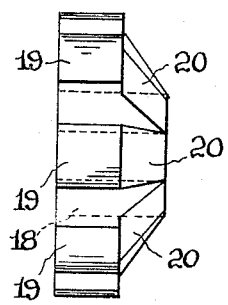
Fig. 7 is a side elevational view of the part shown in Fig. 6.
Figure 9:
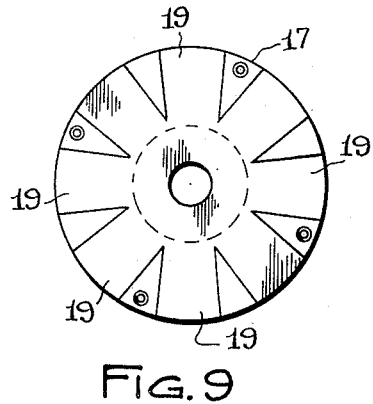
Fig. 9 is a front elevational view of the complete rotor.
Figure 10:
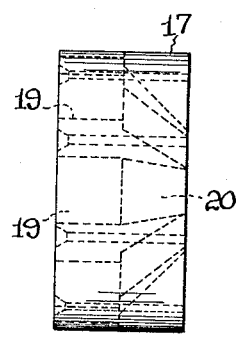
Fig. 10 is a side elevational view of the complete rotor.

It comprises a central annular hub portion 18 having a multiplicity of circumferentially-spaced poles 19, portions of which are removed, as at 20, to permit the die casting in which the rotor is embedded to have a continuous connecting collar or sleeve which interconnects the portions of the die casting between the poles 19. The number of poles 19, it may be noted, is equivalent to the number of poles 5 of the stator, and the faces of the poles 19, as best shown in Fig. 5 extend through an arc which is somewhat longer than the arc of the faces of the poles 5, this arc being approximately the same as the arcuate distances between the radially-innermost ends of the poles 5. It may be further noted that the removal of the portions of the poles, as at 20, has the effect of concentrating the flux lines in the poles 19, which is highly desirable for the purposes of the present invention.

By using pure iron, or an equivalent metal or alloy as the stator of the generator or alternator, and with the electrical field which has been described, I am able to control the voltage, under load, of the generator, irrespective of any increase in the generator shaft speed.

The present generator, for example, has a shaft speed which may vary from 500 to 3000 R. P. M. The voltage developed by the generator under these varying speed conditions does not drop below 6 volts and does not exceed 7.2 volts. With the rotor which has been described, magnetic flux reversals of approximately 66 per second are developed by the generator, so that the steel selected must be reluctant to flux reversals of over $\frac{1}{66}$ of a second in duration. The coils of the stator are designed to carry the required current, which will also set up eddy currents in the stator steel. When the speed of the generator shaft increases, the voltage and frequency also increase, but as the steel stator receives this increasing frequency, it sets up stronger eddy currents, suppressing or controlling the voltage. The frequency of this alternator, at top speed of 3000 R. P. M., is approximately 200 cycles per second.

Figure 13:
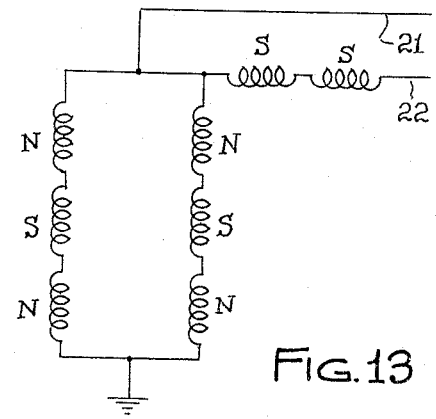
Fig. 13 is a diagram showing the arrangement of the generator coils for another condition of use of the generator.

In Fig. 13 I have shown a modified arrangement of the coils 6, in which the terminal 21 is connected to an intermittent heavy load, such as the horn or radio, and the terminal 22 is connected to a constant light load, such as the headlamp, tail lamp and ignition system.

It is to be understood that the form of my invention, herewith shown and described, is to be taken as a preferred example of the same, and that various changes in the shape, size and arrangement of parts may be resorted to, without departing from the spirit of my invention, or the scope of the subjoined claim.

Having thus described my invention, I claim:

In an alternating current generator of the character described, a continuous cylindrical matrix of non-magnetic material, and a permanent magnet rotor embedded therein and enveloped thereby, said rotor having an annular central hub portion and a plurality of circumferentially-spaced radial poles of alternate opposite polarity extending outwardly therefrom, each of said poles in longitudinal axial section having an angularly extending inclined surface whereby the area of said longitudinal section decreases radially outwardly from a maximum at the radially innermost portion of said pole to a minimum at the radially outermost portion of said pole.

FLOYD A. SHERMAN.

REFERENCES CITED

The following references are of record in the file of this patent:

UNITED STATES PATENTS

| Number | Name | Date |
|---|---|---|
| 578,280 | Turner | Mar. 2, 1897 |
| 1,137,544 | Severy | Apr. 27, 1915 |
| 1,904,308 | Harmon | Apr. 18, 1933 |
| 1,977,600 | Winther | Oct. 16, 1934 |
| 2,071,573 | Randolph | Feb. 23, 1937 |
| 2,081,800 | Dunham | May 25, 1937 |
| 2,104,707 | Rawlings | Jan. 4, 1938 |
| 2,213,724 | Vogel | Sept. 3, 1940 |
| 2,248,030 | Zwack | July 1, 1941 |
| 2,489,517 | Brown | Nov. 29, 1949 |

FOREIGN PATENTS

| Number | Country | Date |
|---|---|---|
| 484,104 | Great Britain | May 2, 1938 |

OTHER REFERENCES

"Standard Handbook for Electrical Engineers," 7th edition, published by McGraw-Hill Company, New York, section 4, page 350.